(12) United States Patent
Kakimi

(10) Patent No.: US 10,974,789 B2
(45) Date of Patent: Apr. 13, 2021

(54) CHAIN-DRIVE MECHANISM FOR BICYCLE

(71) Applicant: Tomio Kakimi, Shiga (JP)

(72) Inventor: Tomio Kakimi, Shiga (JP)

(73) Assignee: Tomio Kakimi, Shiga (JP)

( * ) Notice: Subject to any disclaimer, the term of this patent is extended or adjusted under 35 U.S.C. 154(b) by 0 days.

(21) Appl. No.: 16/610,909

(22) PCT Filed: May 31, 2019

(86) PCT No.: PCT/JP2019/021807
§ 371 (c)(1),
(2) Date: Nov. 5, 2019

(87) PCT Pub. No.: WO2020/174706
PCT Pub. Date: Sep. 3, 2020

(65) Prior Publication Data
US 2020/0277022 A1 Sep. 3, 2020

(30) Foreign Application Priority Data
Feb. 28, 2019 (JP) .................................. 2019-037046

(51) Int. Cl.
*B62M 9/10* (2006.01)
*B62M 3/08* (2006.01)
(Continued)

(52) U.S. Cl.
CPC ................. *B62M 9/10* (2013.01); *B62M 1/28* (2013.01); *B62M 1/36* (2013.01); *B62M 3/08* (2013.01);
(Continued)

(58) Field of Classification Search
CPC . B62M 9/00; B62M 9/04; B62M 9/06; B62M 9/10; B62M 9/105; B62M 1/28;
(Continued)

(56) References Cited

U.S. PATENT DOCUMENTS 378,088 A * 2/1888 Foote ........................ F16H 9/04
 192/51
444,341 A * 1/1891 Egg .......................... F16H 55/36
 474/74

(Continued)

FOREIGN PATENT DOCUMENTS

CN 102582771 A 7/2012

*Primary Examiner* — Michael R Mansen
*Assistant Examiner* — Raveen J Dias
(74) *Attorney, Agent, or Firm* — Idea Intellectual Limited; Margaret A. Burke; Sam T. Yip

(57) ABSTRACT

Provided is a chain-drive mechanism for bicycles having a simple configuration and low manufacturing, and capable of transmitting a driving force to a rear wheel when the crank arms rotate forward and reversely. The chain-drive mechanism for bicycle includes: an inner sprocket configured to integrally rotate with a crankshaft of a bicycle; and an outer sprocket disposed coaxially and in parallel with the inner sprocket to be rotatable relative to the crankshaft. An inner freewheel coaxially rotates with the rear wheel of the bicycle, and an outer freewheel is placed in parallel and coaxially with the inner freewheel. A chain runs on the inner sprocket, the outer sprocket, the inner freewheel and the outer freewheel so that the outer sprocket and the inner sprocket rotate in opposite directions and the outer freewheel and the inner freewheel rotate in opposite directions.

6 Claims, 5 Drawing Sheets

(51) Int. Cl.
   *B62M 1/36*   (2013.01)
   *B62M 1/28*   (2013.01)
   *B62M 9/06*   (2006.01)
   *B62M 9/02*   (2006.01)
(52) U.S. Cl.
   CPC ............... *B62M 9/02* (2013.01); *B62M 9/06*
           (2013.01); *B62M 9/105* (2013.01)
(58) Field of Classification Search
   CPC . B62M 1/36; B62M 3/08; B62M 9/02; B62M
                 9/12; B62M 1/24; B62M 1/26
   USPC .......................................................... 474/74
   See application file for complete search history.

(56) References Cited

U.S. PATENT DOCUMENTS

| | | | | |
|---|---|---|---|---|
| 632,623 A * | 9/1899 | Bartlett | ..................... | F16H 7/06 |
| | | | | 474/84 |
| 797,814 A * | 8/1905 | Mimard | ................. | F16H 3/003 |
| | | | | 74/810.1 |
| 1,608,141 A * | 11/1926 | Shekerjian | ............... | B62M 9/04 |
| | | | | 474/74 |
| 2,463,100 A * | 3/1949 | Gredell | .................... | B62M 7/00 |
| | | | | 474/70 |
| 3,581,853 A * | 6/1971 | Hoff | ........................ | B62M 7/00 |
| | | | | 192/218 |
| 4,398,740 A * | 8/1983 | Clem | ....................... | B62M 9/02 |
| | | | | 280/259 |
| 4,501,575 A * | 2/1985 | Lapeyre | .................... | B62M 9/04 |
| | | | | 474/74 |
| 5,254,042 A * | 10/1993 | Chung-Suk | .............. | B62M 1/36 |
| | | | | 280/237 |
| 9,630,680 B1 * | 4/2017 | Griffith, Jr. | ............. | B62M 1/36 |
| 2006/0122016 A1 * | 6/2006 | Hee | .......................... | B62M 9/04 |
| | | | | 474/80 |
| 2012/0280466 A1 * | 11/2012 | Woods | ..................... | B62M 3/00 |
| | | | | 280/261 |
| 2014/0251709 A1 * | 9/2014 | Ruffieux | .................. | B62M 1/36 |
| | | | | 180/206.3 |
| 2017/0334517 A1 * | 11/2017 | Zuniga | ..................... | B62M 1/36 |
| 2018/0141614 A1 * | 5/2018 | Hsu | .......................... | F16H 9/24 |

* cited by examiner

CHAIN-DRIVE MECHANISM FOR BICYCLE

TECHNICAL FIELD

The present invention relates to a drive mechanism for bicycles, and particularly relates to a chain-drive mechanism for bicycles configured to transmit a driving force to a rear wheel via a chain.

BACKGROUND ART

Most of the widely prevalent drive units for bicycles include the combination of a crank mechanism and a chain/sprocket mechanism. A drive unit of this type is configured to transmit a driving force to a rear wheel via a chain that circles with the rotation of left and right crank arms.

A typical bicycle includes a freewheel assembled in the rear wheel, and is configured to transmit the torque to a rear-wheel shaft only when the left and right crank arms rotate forward. Patent Literature 1 discloses a bicycle configured to transmit a driving force to the rear wheel when the crank arms rotate forward as well as reversely.

CITATION LIST

Patent Literature 1: China Patent Application No. 102582771

SUMMARY OF INVENTION

Technical Problem

The driving unit for bicycles disclosed in Patent Literature 1 rotates the left and the right crank arms in the mutually opposite directions via a bevel gear. Such a configuration requires new mechanical components to be assembled. This complicates the overall configuration and accordingly increases the manufacturing cost.

In view of the problem, the present invention aims to provide a chain-drive mechanism for bicycles having a simpler overall configuration than ever before and keeping the manufacturing cost down, and capable of transmitting a driving force to a rear wheel when the crank arms rotate forward as well as reversely.

Solution to Problem

To achieve the aim, a chain-drive mechanism for bicycle according to the present invention includes: an inner sprocket configured to integrally rotate with a crankshaft of a bicycle; an outer sprocket disposed coaxially and in parallel with the inner sprocket to be rotatable relative to the crankshaft; an inner freewheel configured to coaxially rotate with a rear wheel of the bicycle; an outer freewheel disposed coaxially and in parallel with the inner freewheel; and a chain configured to run on the inner sprocket, the outer sprocket, the inner freewheel and the outer freewheel so that the outer sprocket and the inner sprocket rotate in opposite directions and the outer freewheel and the inner freewheel rotate in opposite directions.

The chain may run on gear parts on vertically opposite sides of the sprockets and the freewheels on different sides of an inside and an outside of the chain-drive mechanism, and may run on gear parts on a vertically same side of the sprockets and the freewheels on a same side of the inside and the outside.

The chain may run on gear parts on vertically opposite sides of the sprockets and the freewheels on a same side of an inside and an outside of the chain-drive mechanism, and may run on gear parts on a vertically same side of the sprockets and the freewheels on different sides of the inside and the outside.

The inner sprocket and the outer sprocket may have the same number of teeth.

The chain-drive mechanism for bicycle may further include: a left crank arm having a distal end and a proximal end on the opposite side of the distal end, a pedal being disposed at the distal end, the proximal end being fixed to a left end of the crankshaft; and a right crank arm having a distal end and a proximal end on the opposite side of the distal end, a pedal being disposed at the distal end, the proximal end being attached to a right end of the crankshaft to be rotatable relative to the crankshaft. The left crank arm and the inner sprocket may integrally rotate with the crankshaft, and the right crank arm may integrally rotate with the outer sprocket in an opposite direction from the rotating direction of the left crank arm.

Advantageous Effects of Invention

The chain-drive mechanism for bicycles having the above configuration includes the chain that is arranged so that the inner and outer sprockets as well as the inner and outer freewheels always rotate in the opposite directions. The chain-drive mechanism for bicycle may include the left and the right crank arms that integrally rotate with their corresponding inner and outer sprockets so as to transmit a driving force to the rear wheel when the left and right crank arms rotate forward as well as reversely. This configuration additionally includes some components that are basically used for a typical bicycle driving unit, and is devised in the way of attaching these components. Unlike the conventional drive unit for bicycles, this drive mechanism therefore does not require new mechanical components (gear mechanism, such as a bevel gear) to be assembled. The overall configuration of the drive mechanism is therefore simple and the manufactured cost also is kept down.

DESCRIPTION OF EMBODIMENTS

Figure 1:
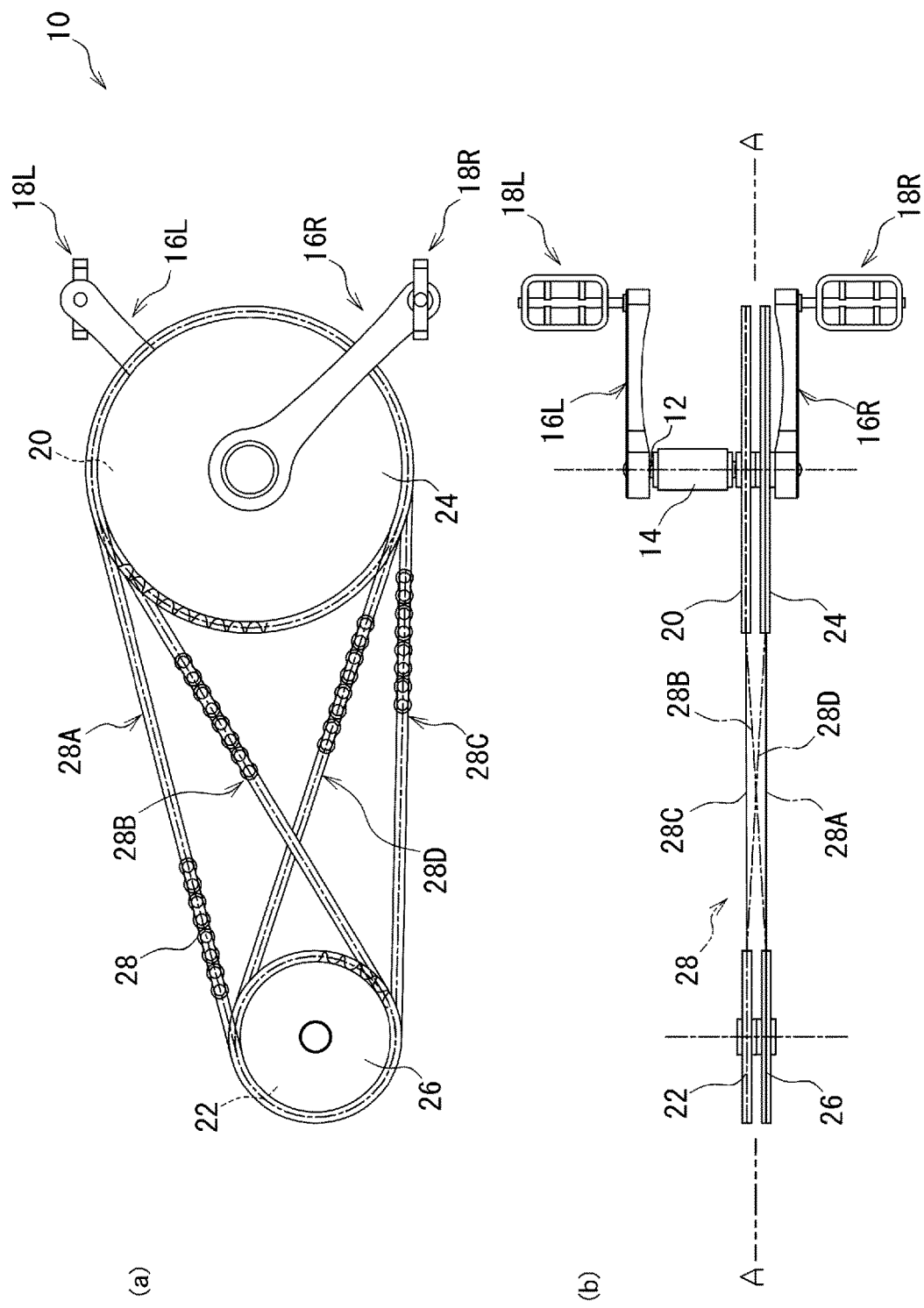
FIG. 1A is a side view schematically showing a chain-drive mechanism for bicycle according to one embodiment.
FIG. 1B is a plan view thereof.

Referring to the drawings, the following describes one embodiment of a chain-drive mechanism (hereinafter simply called a drive mechanism) for bicycles according to the present invention.

A drive mechanism 10 according to this embodiment additionally includes some components that are typically used for the drive mechanism for bicycles, and is devised in the way of attaching these components.

As shown in FIG. 1, the drive mechanism 10 basically has a similar configuration to that of a typical bicycle drive unit. Specifically the configuration of a part above the dashed-two dotted line A-A in FIG. 1B is substantially the same as the configuration of a typical bicycle drive unit.

The drive mechanism 10 includes a crankshaft 12. The crankshaft 12 is supported inside of a bottom bracket 14 via a bearing (not shown), and the bottom bracket 14 is fixed to a lower part of the bicycle frame (not shown).

The drive mechanism 10 includes a left crank arm 16L having a proximal end that is fixed to the left end of the crankshaft 12. The distal end of the left crank arm 16L rotatably supports a left pedal 18L. A sprocket 20 (this may be called a chain wheel) is fixed at the right end of the crankshaft 12. The left crank arm 16L and the sprocket 20 that are fixed to the crankshaft 12 rotate integrally with the crankshaft 12.

The drive mechanism 10 includes a freewheel 22 in the rear of the sprocket 20, and the freewheel 22 coaxially rotates with the rear wheel (not shown) of the bicycle. The drive mechanism 10 includes a well-known ratchet mechanism between the freewheel 22 and the rear-wheel hub (not shown) so as to transmit the torque in only one direction. The drive mechanism 10 is therefore configured so as to transmit the torque to the rear-wheel shaft only when the freewheel 22 rotates in the forward direction (clockwise direction in FIG. 1) that is the same direction of the forward rotation of the rear wheel.

A part below the line A-A is different from the configuration of a typical bicycle drive unit. The following describes the configuration of this different part in details.

Another sprocket 24 (this also may be called a chain wheel) is disposed at the right end of the crankshaft 12. The sprocket 24 has the same configuration as that of the sprocket 20. In other words, both of these sprockets 20 and 24 have the same outer diameter, and gears on their periphery have the same number of teeth. In the following descriptions, the sprocket 24 close to the end in the axial direction of the crankshaft 12 (on the outside) is called an "outer sprocket" and the sprocket 20 close to the center in the axial direction (on the inside) is called an "inner sprocket" to distinguish these two sprockets 20 and 24.

The outer sprocket 24 is placed in parallel and coaxially with the inner sprocket 20, and is attached to the right end of the crankshaft 12 via members (not shown), such as a bearing and a bush. The outer sprocket 24 is therefore rotatable relative to the crankshaft 12 and coaxially rotates with the adjacent inner sprocket 20.

The drive mechanism 10 includes a right crank arm 16R as well that is attached to the right end of the crankshaft 12. Similarly to the left crank arm 16L, the distal end of this right crank arm 16R rotatably supports a right pedal 18R. The proximal end of the right crank arm 16R is fixed to the outer sprocket 24. That is, the right crank arm 16R in this embodiment is attached to the right end of the crankshaft 12 via the sprocket 24 and a bearing (not shown). This allows the right crank arm 16R also to integrally rotate with the sprocket 24 when the sprocket 24 rotates relative to the crankshaft 12.

The drive mechanism 10 includes another freewheel 26 at the right end of the rear wheel shaft. The freewheel 26 has the same configuration as that of the freewheel 22. In other words, both of these freewheels 22 and 26 have the same outer diameter, and gears on their periphery have the same number of teeth. In the following descriptions, the freewheel 26 close to the end (on the outside) in the wheel axial direction is called an "outer freewheel" and the freewheel 22 close to the center (on the inside) in the wheel axial direction is called an "inner freewheel" to distinguish these two freewheels 22 and 26.

The outer freewheel 26 is placed in parallel and coaxially with the inner freewheel 22, and coaxially rotates with the inner freewheel 22 and accordingly the rear wheel of the bicycle. The drive mechanism 10 includes a well-known ratchet mechanism also between the outer freewheel 26 and the rear-wheel shaft so as to transmit the torque in only one direction. Similarly to the inner freewheel 22, the outer freewheel 26 in this embodiment is configured to transmit the torque to the rear-wheel shaft only when the outer freewheel 26 rotates in the forward direction (clockwise direction in FIG. 1) that is the same direction of the forward rotation of the rear wheel.

As stated above, the drive mechanism 10 includes four transmission gears in total, including the two sprockets 20 and 24 for driving (on the front) and the two freewheels 22 and 26 for driven (on the rear). An endless chain 28 runs on each of these four transmission gears.

Figure 2:
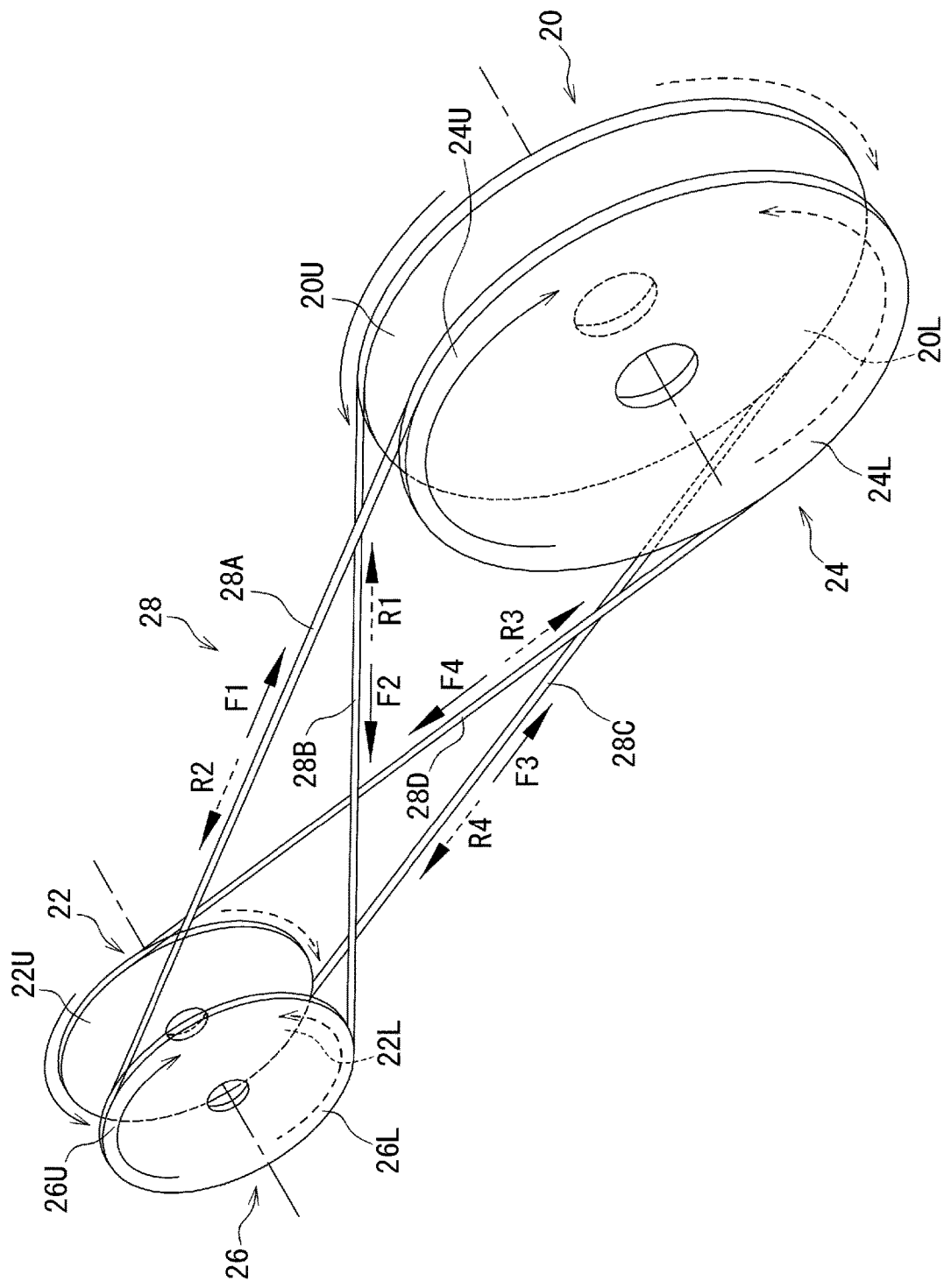
FIG. 2 is a schematic perspective view of the arrangement and the motion of a chain in one embodiment.

The chain 28 is longer than typical chains for a bicycle drive unit, and runs on each of the four transmission gears in the following arrangement. Referring to FIG. 1 and FIG. 2, the following describes the arrangement of the chain 28 in one embodiment.

The chain 28 runs between an upper gear part 24U of the outer sprocket 24 and an upper gear part 26U of the outer freewheel 26, and then turns back toward a lower gear part 26L of the outer freewheel 26. The turning-back chain 28 then runs from the lower gear part 26L of the outer freewheel 26 to an upper gear part 20U of the inner sprocket 20, and turns back toward a lower gear part 20L of the inner sprocket 20. The chain 28 running from the lower gear part 20L of the inner sprocket 20 to a lower gear part 22L of the inner freewheel 22 then turns back toward an upper gear part 22U of the inner freewheel 22 and runs to an lower gear part 24L of the outer sprocket 24.

The chain 28 in such an arrangement runs on the four transmission gears including the two inner and outer sprockets 20 and 24 and the two inner and outer freewheels 22 and 26, and defines the chain portions including the following four sections between the driving-side and the driven-side, i.e., an upper moving portion 28A, a first obliquely moving portion 28B, a lower moving portion 28C and a second obliquely moving portion 28D.

The upper moving portion 28A is a chain portion that moves along the section between the upper gear part 24U of the outer sprocket 24 and the upper gear part 26U of the outer freewheel 26. The first obliquely moving portion 28B is a chain portion that obliquely moves along the section between the upper gear part 20U of the inner sprocket 20 and the lower gear part 26L of the outer freewheel 26. The lower moving portion 28C is a chain portion that moves along the section between the lower gear part 20L of the inner sprocket 20 and the lower gear part 22L of the inner freewheel 22. The second obliquely moving portion 28D is a chain portion that obliquely moves along the section between the lower gear part 24L of the outer sprocket 24 and the upper gear part 22U of the inner freewheel 22 in the direction intersecting with the above-stated first obliquely moving portion 28B.

Among these chain portions, the chain portions between the transmission gears on the same side of the inside and the outside (the upper moving portion 28A and the lower moving portion 28C) run on the gears on the vertically same side, and so are parallel with each other in the plan view as well as in the side view. The chain portions between the transmission gears on different sides of the inside and the outside (the first obliquely moving portion 28B and the second obliquely moving portion 28D) run on the gears on the vertically opposite sides, and so mutually intersect in the plan view as well as in the side view.

In the drive mechanism 10 having the above configuration, the right crank arm 16R always rotates in the direction opposite from the left crank arm 16L. The inner and outer sprockets 20 and 24 for driving as well as the inner and outer freewheels 22 and 26 for driven also always rotate in the mutually opposite directions. Referring to FIG. 1 and FIG. 2, the following describes the movement of such a drive mechanism 10.

In FIG. 2, solid arrows indicate the rotation directions of the transmission gears and the moving direction of the chain 28 when the right crank arm 16R rotates forward, and dashed arrows indicate the rotation directions of the transmission gears and the moving direction of the chain 28 when the left crank arm 16L rotates forward.

Firstly the following describes the movement when the right crank arm 16R rotates forward.

When the right crank arm 16R rotates forward, the outer sprocket 24 also integrally rotates forward. This moves the upper moving portion 28A of the chain 28 from the outer freewheel 26 to the outer sprocket 24 (arrow F1). Along with this movement of the upper moving portion 28A, the outer freewheel 26 is driven to rotate. This transmits the torque to the rear-wheel shaft.

When the outer freewheel 26 rotates forward, the first obliquely moving portion 28B of the chain 28 moves from the inner sprocket 20 to the outer freewheel 26 (arrow F2). Along with this movement of the first obliquely moving portion 28B, the inner sprocket 20 rotates reversely, so that the left crank arm 16L also rotates reversely integral with the inner sprocket 20.

The reverse rotation of the inner sprocket 20 moves the lower moving portion 28C of the chain 28 from the inner freewheel 22 to the inner sprocket 20 (arrow F3). Along with this movement of the lower moving portion 28C, the inner freewheel 22 is driven to rotate reversely, so that the second obliquely moving portion 28D of the chain 28 moves from the outer sprocket 24 to the inner freewheel 22 (arrow F4). Along with such movement of the second obliquely moving portion 28D, the outer sprocket 24 rotates forward, so that the right crank arm 16R also integrally rotates forward with the outer sprocket 24. Such a series of movement allows the chain 28 to repeat the circling along the endless trajectory.

Next the following describes the movement when the left crank arm 16L rotates forward.

When the left crank arm 16L rotates forward, the inner sprocket 20 also integrally rotates forward. This moves the first obliquely moving portion 28B of the chain 28 from the outer freewheel 26 to the inner sprocket 20 (arrow R1). Along with this movement of the first obliquely moving portion 28B, the outer freewheel 26 is driven to rotate reversely, so that the upper moving portion 28A of the chain 28 moves from the outer sprocket 24 to the outer freewheel 26 (arrow R2).

The movement of the upper moving portion 28A rotates the outer sprocket 24 reversely, so that the right crank arm 16R also rotates reversely integral with the outer sprocket 24. Such reverse rotation of the outer sprocket 24 moves the second obliquely moving portion 28D of the chain 28 from the inner sprocket 22 to the outer sprocket 24 (arrow R3). Along with this movement of the second obliquely moving portion 28D, the inner freewheel 22 is driven to rotate forward. This transmits the torque to the rear-wheel shaft.

Along with the driven rotation of the inner freewheel 22 forward, the lower moving portion 28C of the chain 28 moves from the inner sprocket 20 to the inner freewheel 22 (arrow R4). The movement of the lower moving portion 28C rotates the inner sprocket 20 forward, so that the left crank arm 16L also rotates forward integral with the inner sprocket 20. Such a series of movement allows the chain 28 to repeat the circling along the endless trajectory in the opposite direction from the above.

In this way, the drive mechanism 10 of this embodiment includes the chain 28 that is arranged so that the inner and outer sprockets 20 and 24 as well as the inner and outer freewheels 22 and 26 always mutually rotate in the opposite directions. This configuration rotates the left crank arm 16L, which integrally rotates with the inner sprocket 20, and the right crank arm 16R, which integrally rotates with the outer sprocket 24, in the mutually opposite directions so as to transmit the torque to the rear-wheel shaft when the left and right crank arms 16L and 16R rotate forward as well as reversely. The drive mechanism 10 therefore transmits a driving force to the rear wheel irrespective of the rider's way of stepping on the left and right pedals 18L and 18R.

This allows the rider to make a selection from a wide range of pedaling operation as they prefer, such as stepping-like pedaling to alternately step on the left and right pedals 18L and 18R, and changing the stepping position on the pedals 18L and 18R during travelling on the bicycle. Alternatively the stepping positions on the pedals 18L and 18R may be determined in advance for the competition of a relay system, for example, to introduce a new game element to bicycle. Since required muscles vary with the way of pedaling, the load applied to the muscles may be distributed during traveling. Wide practicality also can be expected, such as the application to muscle training.

The drive mechanism 10 additionally includes some components that are basically used for a typical drive unit for bicycles, and is devised in the way of attaching these components. Unlike the drive unit for bicycles disclosed in the above Patent Literature 1, this drive mechanism 10 therefore does not require new mechanical components (gear mechanism, such as a bevel gear) to be assembled. The overall configuration of the drive mechanism 10 is therefore simple and the manufactured cost also is kept down.

That is the description on the chain-drive mechanism for bicycle according to the present invention by way of the embodiment. The present invention is not limited to the above embodiment, and may include the following modified embodiments.

Figure 3:
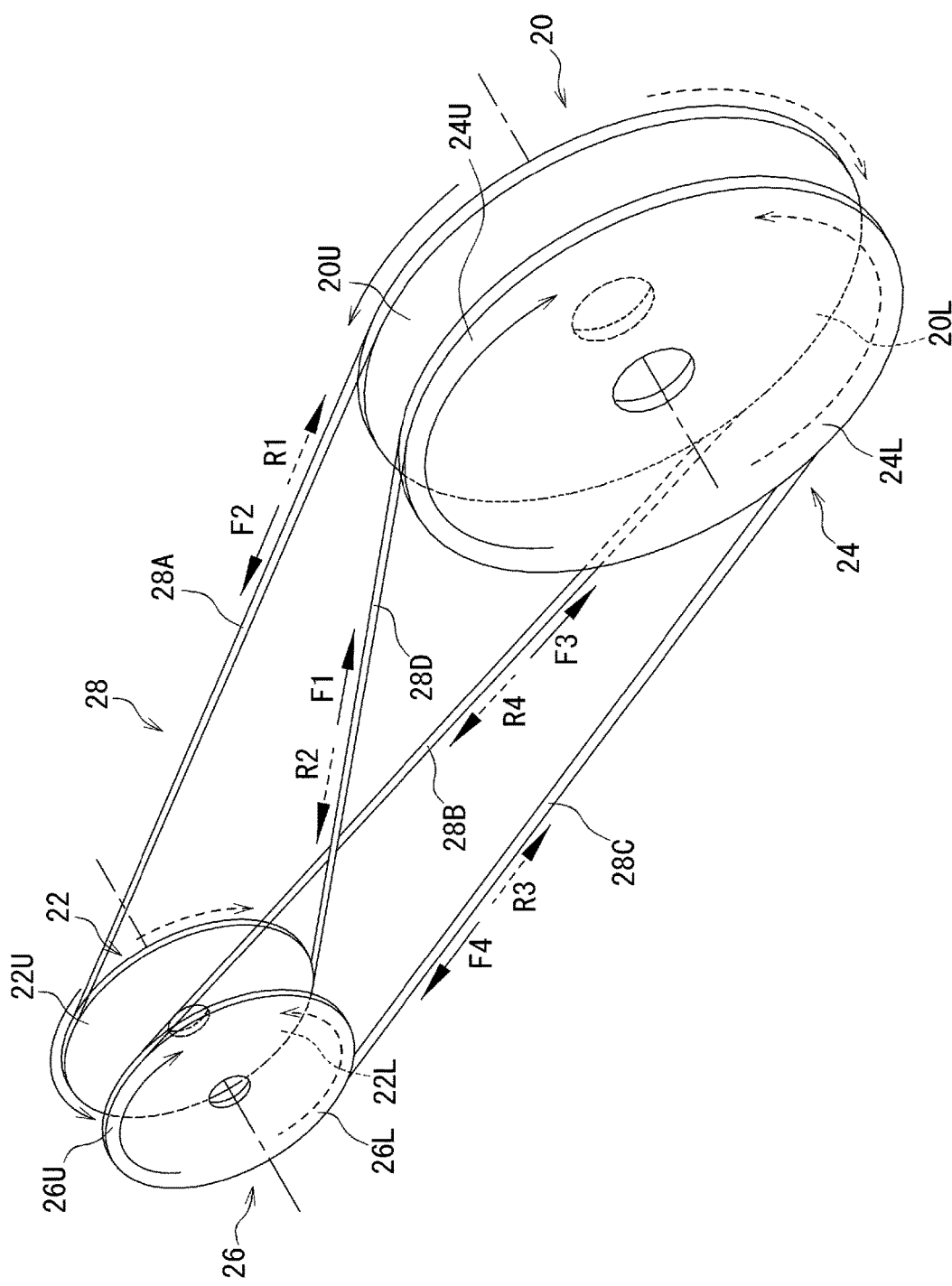
FIG. 3 is a schematic perspective view of the arrangement and the motion of a chain in Modified Example 1.
Figure 4:
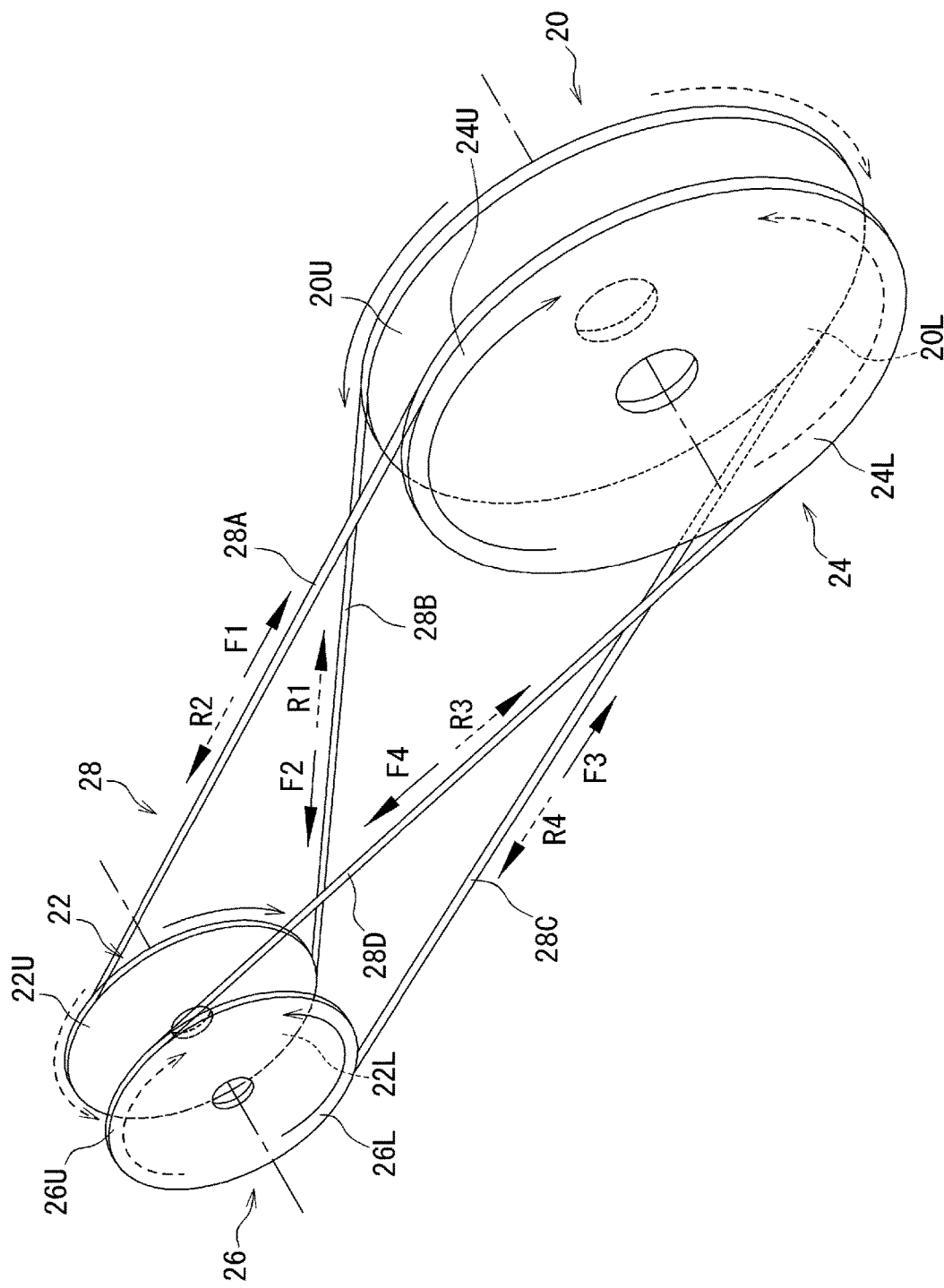
FIG. 4 is a schematic perspective view of the arrangement and the motion of a chain in Modified Example 2.
Figure 5:
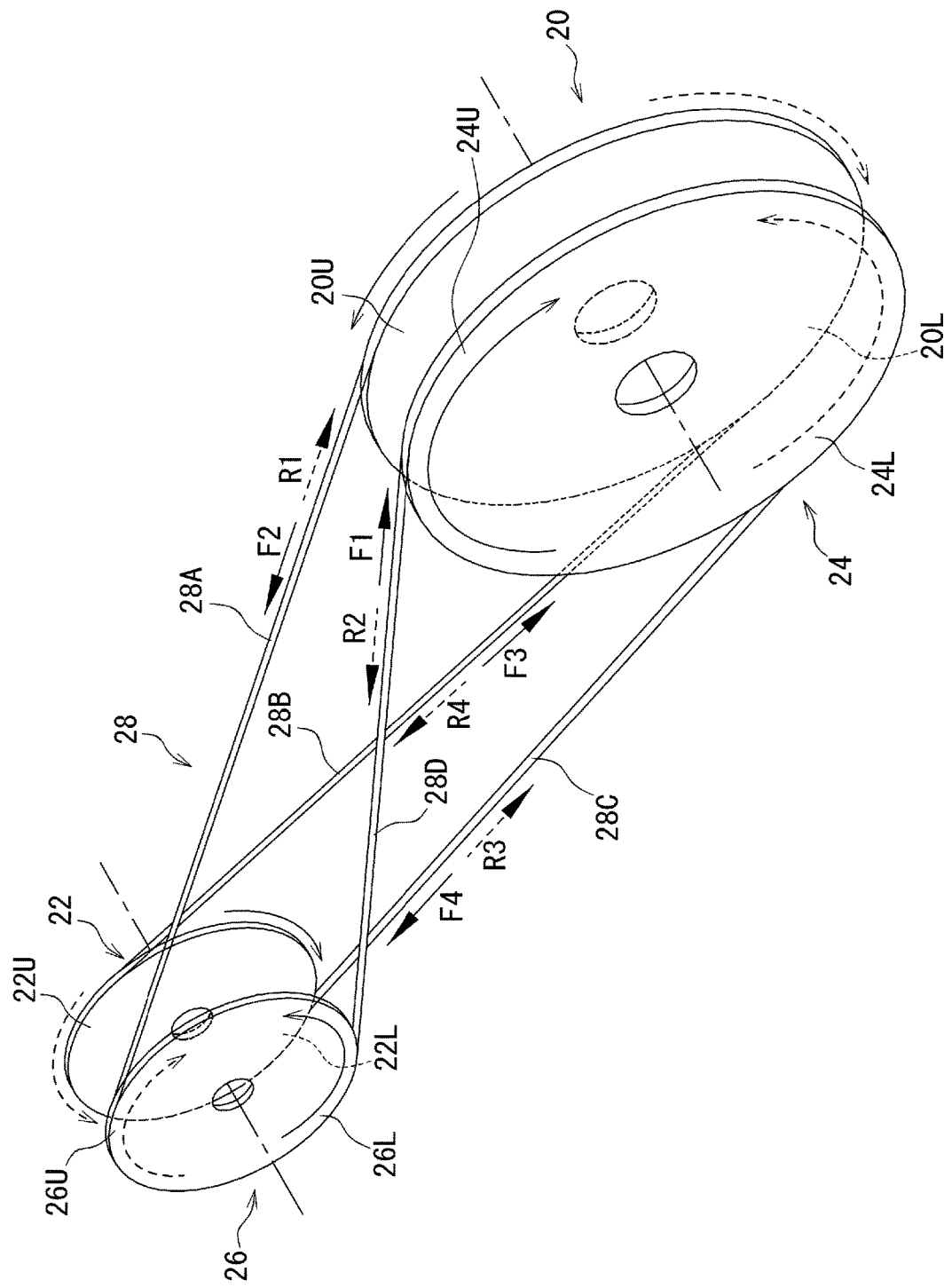
FIG. 5 is a schematic perspective view of the arrangement and the motion of a chain in Modified Example 3.

Similarly to FIG. 2, also in FIG. 3 to FIG. 5 showing the following Modified Examples 1 to 3, solid arrows indicate the rotation directions of the transmission gears and the moving direction of the chain 28 when the right crank arm 16R rotates forward, and dashed arrows indicate the rotation directions of the transmission gears and the moving direction of the chain 28 when the left crank arm 16L rotates forward.

Modified Example 1

The chain 28 in the above embodiment may be arranged so that the chain portions running on the transmission gears on the same side of the inside and the outside and the chain portions running on the transmission gears on different sides of the inside and the outside have a vertically opposite relationship.

In this case, as shown in FIG. 3, the upper moving portion 28A of the chain 28 moves along the section between the upper gear part 20U of the inner sprocket 20 and the upper gear part 22U of the inner freewheel 22, and the lower moving portion 28C moves along the section between the lower gear part 24L of the outer sprocket 24 and the lower gear part 26L of the outer freewheel 26. The first obliquely moving portion 28B of the chain 28 obliquely moves along the section between the lower gear part 20L of the inner sprocket 20 and the upper gear part 26U of the outer freewheel 26, and the second obliquely moving portion 28D obliquely moves along the section between the upper gear part 24U of the outer sprocket 24 and the lower gear part 22L of the inner freewheel 22 in the direction intersecting with the first obliquely moving portion 28B. The moving (obliquely moving) direction of each chain portion is reversed from the above embodiment when the left crank arm 16L rotates forward and when the right crank arm 16R rotates forward.

Modified Example 2

The chain 28 in the above embodiment may arranged so that the chain 28 runs on the gear parts on the vertically opposite sides of the sprockets 20, 24 and the freewheels 22, 26 on the same side of the inside and the outside and runs on the gear parts on the vertically same side of the sprockets 20, 24 and the freewheels 22, 26 on different sides of the inside and the outside.

In this case, as shown in FIG. 4, the upper moving portion 28A of the chain 28 moves along the section between the upper gear part 24U of the outer sprocket 24 and the upper gear part 22U of the inner freewheel 22, and the lower moving portion 28C moves along the section between the lower gear part 20L of the inner sprocket 20 and the lower gear part 26L of the outer freewheel 26. The first obliquely moving portion 28B of the chain 28 obliquely moves along the section between the upper gear part 20U of the inner sprocket 20 and the lower gear part 22L of the inner freewheel 22, and the second obliquely moving portion 28D obliquely moves along the section between the lower gear part 24L of the outer sprocket 24 and the upper gear part 26U of the outer freewheel 26 in the direction intersecting with the first obliquely moving portion 28B. The moving (obliquely moving) direction of each chain portion is the same as that in the above embodiment when the left crank arm 16L rotates forward and when the right crank arm 16R rotates forward.

Modified Example 3

The chain 28 in the above Modified Example 2 may be arranged so that, similarly to the above Modified Example 1, the chain portions running on the transmission gears on the same side of the inside and the outside and the chain portions running on the transmission gears on different sides of the inside and the outside have a vertically opposite relationship.

In this case, as shown in FIG. 5, the upper moving portion 28A of the chain 28 moves along the section between the upper gear part 20U of the inner sprocket 20 and the upper gear part 26U of the outer freewheel 26, and the lower moving portion 28C moves along the section between the lower gear part 24L of the outer sprocket 24 and the lower gear part 22L of the inner freewheel 22. The first obliquely moving portion 28B of the chain 28 obliquely moves along the section between the lower gear part 20L of the inner sprocket 20 and the upper gear part 22U of the inner freewheel 22, and the second obliquely moving portion 28D obliquely moves along the section between the upper gear part 24U of the outer sprocket 24 and the lower gear part 26L of the outer freewheel 26 in the direction intersecting with the first obliquely moving portion 28B. The moving (obliquely moving) direction of each chain portion is reversed from the above Modified Example 2 when the left crank arm 16L rotates forward and when the right crank arm 16R rotates forward.

Such arrangements of the chain 28 in the above Modified Examples 1 to 3 also have the same actions and functions as those in the above embodiment, because the chain 28 runs so that the inner and outer sprockets 20, 24 as well as the inner and outer freewheels 22, 26 always rotate in the mutually opposite directions like the above embodiment.

Other Modified Examples (1) The above embodiment includes the inner and outer freewheels 22 and 26 having the same configuration, i.e., the freewheels 22 and 26 have the same outer diameter, and gears on their periphery have the same number of teeth. They may have different configurations.

(2) The above embodiment is configured so that the left and right crank arms 16L and 16R overlap in the side view when they have the horizontal posture in the rotational phase. The present invention is not limited to such an overlapping rotational phase. In another example, the overlapping rotational phase may be set at a position displaced from the horizontal posture by 45°. In this way, the overlapping rotational phase may be set as the rider prefers.

Embodiments of the present invention can be variously improved, altered, or modified based on the knowledge of those skilled in the art without departing from the spirit of the present invention. Any matters specifying the invention may be replaced with other techniques in an embodiment as long as the same action or effects are obtained from the embodiment.

INDUSTRIAL APPLICABILITY

A chain-drive mechanism for bicycle according to the present invention is applicable not only to typical two-wheel bicycles but also to bicycles with three wheels or more.

REFERENCE SIGNS LIST

10 Chain-drive mechanism for bicycle
20 Inner sprocket
22 Inner freewheel
24 Outer sprocket
26 Outer freewheel
28 Chain

The invention claimed is:
1. A chain-drive mechanism for bicycle, comprising:
an inner sprocket configured to integrally rotate with a crankshaft of a bicycle;
an outer sprocket disposed coaxially and in parallel with the inner sprocket to be rotatable relative to the crankshaft;
an inner freewheel configured to coaxially rotate with a rear wheel of the bicycle;
an outer freewheel disposed coaxially and in parallel with the inner freewheel;
a chain configured to run on the inner sprocket, the outer sprocket, the inner freewheel and the outer freewheel so that the outer sprocket and the inner sprocket rotate in opposite directions and the outer freewheel and the inner freewheel rotate in opposite directions;

a left crank arm having a distal end and a proximal end on an opposite side of the distal end, a pedal being disposed at the distal end, the proximal end being fixed to a left end of the crankshaft; and a right crank arm having a distal end and a proximal end on an opposite side of the distal end, a pedal being disposed at the distal end of the right crank arm, the proximal end of the right crank arm being attached to a right end of the crankshaft to be rotatable relative to the crankshaft;

wherein the left crank arm and the inner sprocket integrally rotate with the crankshaft; and wherein the right crank arm integrally rotates with the outer sprocket in an opposite direction from a rotating direction of the left crank arm.

2. The chain-drive mechanism for bicycle according to claim 1, wherein the inner sprocket and the outer sprocket have the same number of teeth.

3. The chain-drive mechanism for bicycle according to claim 1, wherein the chain runs from a lower side of the outer sprocket to an upper side of the inner freewheel, then from a lower side of the inner freewheel to a lower side of the inner sprocket, then from an upper side of the inner sprocket to a lower side of the outer freewheel, then from an upper side of the outer freewheel to an upper side of the outer sprocket.

4. The chain-drive mechanism for bicycle according to claim 1, wherein the chain runs from a lower side of the outer sprocket to a lower side of the outer freewheel, then from an upper side of the outer freewheel to a lower side of the inner sprocket, then from an upper side of the inner sprocket to an upper side of the inner freewheel, then from a lower side of the inner freewheel to an upper side of the outer sprocket.

5. The chain-drive mechanism for bicycle according to claim 1, wherein the chain runs from a lower side of the outer sprocket to an upper side of the outer freewheel, then from a lower side of the outer freewheel to a lower side of the inner sprocket, then from an upper side of the inner sprocket to a lower side of the inner freewheel, then from an upper side of the inner freewheel to an upper side of the outer sprocket.

6. The chain-drive mechanism for bicycle according to claim 1, wherein the chain runs from a lower side of the outer sprocket to a lower side of the inner freewheel, then from an upper side of the inner freewheel to a lower side of the inner sprocket, then from an upper side of the inner sprocket to an upper side of the outer freewheel, then from a lower side of the outer freewheel to an upper side of the outer sprocket.

* * * * *